United States Patent [19]
Milovich

[11] Patent Number: 4,932,522
[45] Date of Patent: Jun. 12, 1990

[54] CD STORAGE WITH AUTOMATIC OPENING DEVICE

[76] Inventor: Steven L. Milovich, 706 N. 78th, Seattle, Wash. 98103

[21] Appl. No.: 410,307

[22] Filed: Sep. 21, 1989

[51] Int. Cl.⁵ .............................. B65D 85/57
[52] U.S. Cl. ...................... 206/309; 312/12; 211/40
[58] Field of Search ............ 206/309, 310, 387; 312/8, 10, 12, 15, 16, 18; 211/40

[56] References Cited

U.S. PATENT DOCUMENTS

| | | | |
|---|---|---|---|
| 3,836,222 | 4/1973 | Kuntze | 312/319 |
| 3,951,264 | 4/1976 | Heidecker | 206/444 |
| 4,164,782 | 8/1979 | Stewart | 360/133 |
| 4,239,108 | 12/1980 | Coleman | 206/312 |
| 4,316,539 | 2/1982 | Torrington | 206/307 |
| 4,330,161 | 5/1982 | Khawand | 312/18 |
| 4,454,599 | 6/1984 | Tsuchiya | 369/77 |
| 4,463,849 | 8/1984 | Prusak | 206/307 |
| 4,493,417 | 1/1985 | Ackeret | 206/387 |
| 4,498,161 | 2/1985 | Eisemann | 396/75 |
| 4,520,470 | 5/1985 | d'Alayer de Costemore | 369/72 |
| 4,664,261 | 5/1987 | Frodelius | 206/387 |
| 4,691,257 | 9/1987 | Taguchi | 360/97 |
| 4,702,369 | 10/1987 | Philosophe | 206/312 |
| 4,743,991 | 5/1988 | Akiyama | 360/97 |
| 4,745,500 | 5/1988 | Davis | 360/97 |
| 4,793,480 | 12/1988 | Gelardi | 206/312 |
| 4,802,049 | 1/1989 | Tanaka | 360/133 |

Primary Examiner—Paul T. Sewell
Assistant Examiner—Jacob Ackun, Jr.
Attorney, Agent, or Firm—Graybeal, Jensen & Puntigam

[57] ABSTRACT

A storage device for compact disks or the like including tray members (46) including means (50, 56) to secure the disk container and a device (26) secured to the hinged lid (12) of the container to open the container when the tray is pulled outwardly of the storage device.

4 Claims, 4 Drawing Sheets

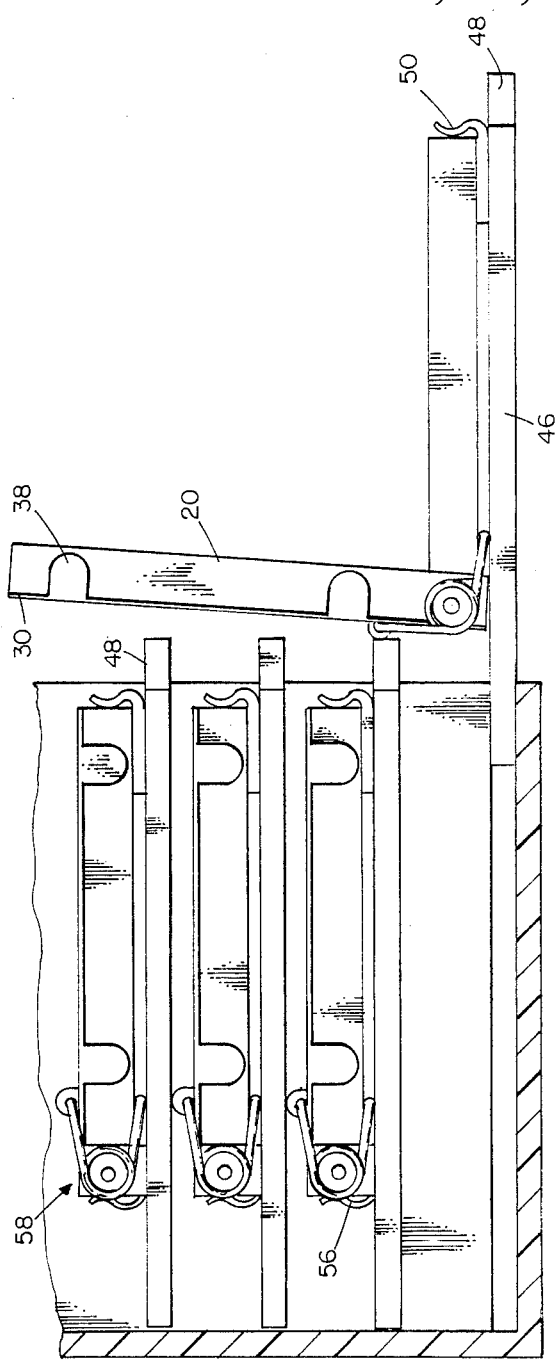

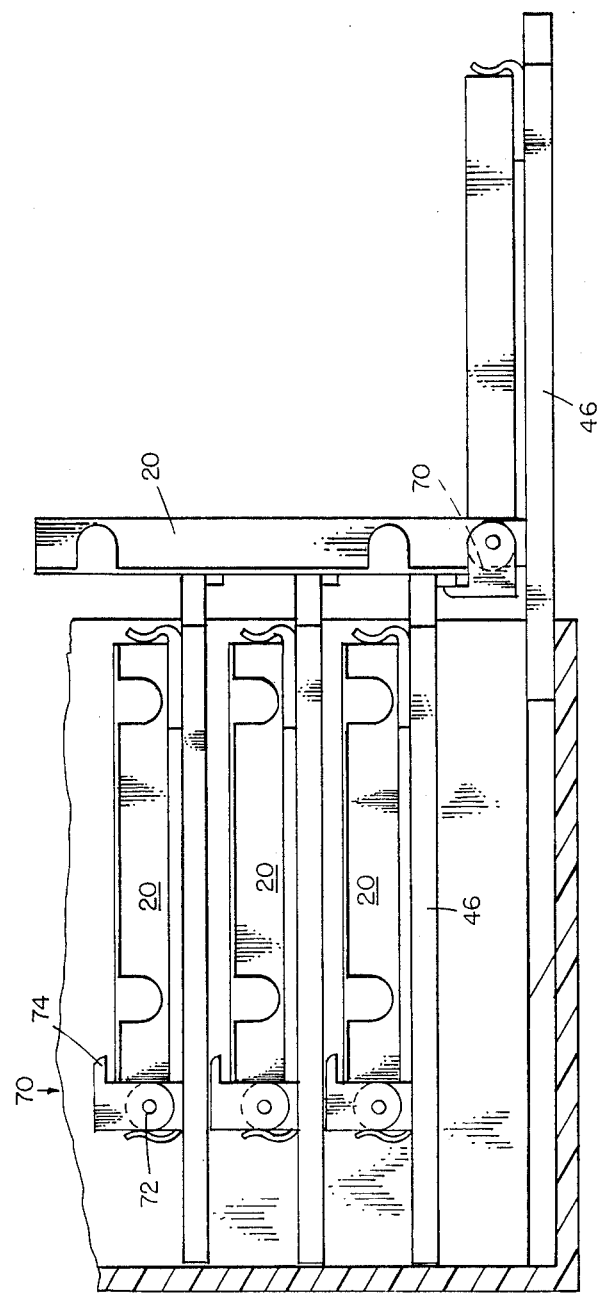

CD STORAGE WITH AUTOMATIC OPENING DEVICE

DESCRIPTION

1. Technical Field

This invention relates to storage for compact disks or the like while still in the original container and, more particularly, to a storage container which protects the disks from damage and includes means to open a standard compact disk case for easy and rapid access while the case is being drawn from the storage container.

2. Background Art

The introduction of compact disks to the music appreciators' world has, in fact, revolutionized many aspects of music appreciation. The clarity of sound available from a compact disk and the versatility of use permits an audiophile to be able to appreciate music at its best in any one of several surroundings and or circumstances, such as automobile, boat, home, office or the like. One of the facts which contribute to compact disks retaining their fidelity is that they are individually stored in plastic containers, which are provided with the disk when purchased and these containers are held closed by friction and are relatively dust proof. These protective containers, however, are virtually impossible to open with one hand and therefore make it impossible to change disks when one is driving or otherwise occupied in an activity which requires the constant use of one hand.

The opposite problems occurs, however, when a disk is often used, since the parts which frictionally hold the case closed are plastic and tend to wear down allowing the case to open unpredictably and the disk to fall out of the case.

2. Prior Art

Patents which have directed their attention to either keeping stored data clean or easily accessible include U.S. Pat. No. 3,836,222 granted to Kuntze Sept. 17, 1974, which discloses a drawer for cassettes which include means to hold the cassette in position and to tilt the cassette upwardly when the drawer is pulled to its outermost position. The cassette is either not in a case when stored, and there is no provision for opening the case.

U.S. Pat. No. 3,951,264, granted to Heidecker et al on Apr. 20, 1976, discloses a cartridge for a flexible disk including an internal tray having a hub to properly locate the disk for machine loading.

U.S. Pat. No. 4,164,782, granted to Stewart on Aug. 14, 1979, discloses a locking mechanism for securing a record within a jacket.

U.S. Pat. No. 4,239,108, granted to Coleman et al on Dec. 16, 1980, discloses a video disk caddy, particularly configured for use with a recordextracting mechanism.

U.S. Pat. No. 4,316,539 granted to Torrington on Feb. 23, 1982, discloses a video disk caddy including a record/spine assembly which may be directly inserted into the disk player.

U.S. Pat. No. 4,454,599, granted to Tsuchiya on June 12, 1984, discloses a cover for an apparatus for reproducing signals from a disk wherein the cover cannot be opened during the time the disk is being played.

U.S. Pat. No. 4,463,849, granted to Prusak et al on Aug. 7, 1984, discloses a video disk caddy which includes wiping pads for cleaning the disk.

U.S. Pat. No. 4,493,417, granted to Ackeret on Jan. 15, 1985, discloses a storage device for flat recording media, including a means to tip or lift a media-receiving shelf when the drawer is opened for ease of insertion and/or removal of the media.

U.S. Pat. No. 4,498,161, granted to Eisemann on Feb. 5, 1985, discloses a disk player, including a disk loader to assist in the proper placement of the disk for playing thereof.

U.S. Pat. No. 4,520,470, granted to d'Alayer de Costemore d'Arc on May 20, 1985, discloses a disk or record cleaning device within a storage container.

U.S. Pat. No. 4,691,257, granted to Taguchi on Sept. 1, 1987, discloses a device allowing insertion and ejection of a disk without exposing the inside of the disk drive thereby reducing the danger of damage and eliminating one source of dust or the like.

U.S. Pat. No. 4,702,369, granted to Philosophe on Oct. 27, 1987, discloses a clamshell-type disk storage device and a disk storage device having a plurality of drawers for storing the disks.

U.S. Pat. No. 4,743,991, granted to Akiyama on May 10, 1988, discloses apparatus for receiving a record jacket having a disk therein prior to playing the disk.

U.S. Pat. No. 4,745,500, granted to Davis on May 17, 1988, discloses a disk drive for cartridge disks.

U.S. Pat. No. 4,793,480, granted to Gelardi et al on Dec. 27, 1988, discloses a storage container for recording material including an interior support device which pivots upwardly when the container is opened.

U.S. Pat. No. 4,802,049, granted to Tanaka et al on Jan. 31, 1989, discloses a disk cartridge which is capable of centering a disk inserted therein.

DISCLOSURE OF THE INVENTION

With the above-noted prior art and problems in mind, it is an object of the present invention to provide a storage container for multiple disks which will receive the compact disk in the container in which it is sold and permit the removal of the container from storage and the opening of the disk container with a one-handed operation.

It is another object of the present invention to provide a plurality of vertical shelf-like disk-supporting elements upon which the compact disk and its container may be placed and each shelf includes means such that when the shelf is pulled outwardly to expose the disk, the disk cover is automatically opened.

Yet another object of the present invention is the provision of a device which when secured to a container for a compact disk will open the container unless restrained.

It is still a further object of the present invention to provide a means for adapting a standard compact disk container by placing it in a storage device such that when the disk is needed the container is automatically opened.

BRIEF DESCRIPTION OF THE DRAWINGS

FIG. 3 is a side elevational view along line 3—3 of FIG. 1.

FIG. 4 is a side elevational view of a second embodiment of the present invention.

BEST MODE FOR CARRYING OUT THE INVENTION

Figure 1:
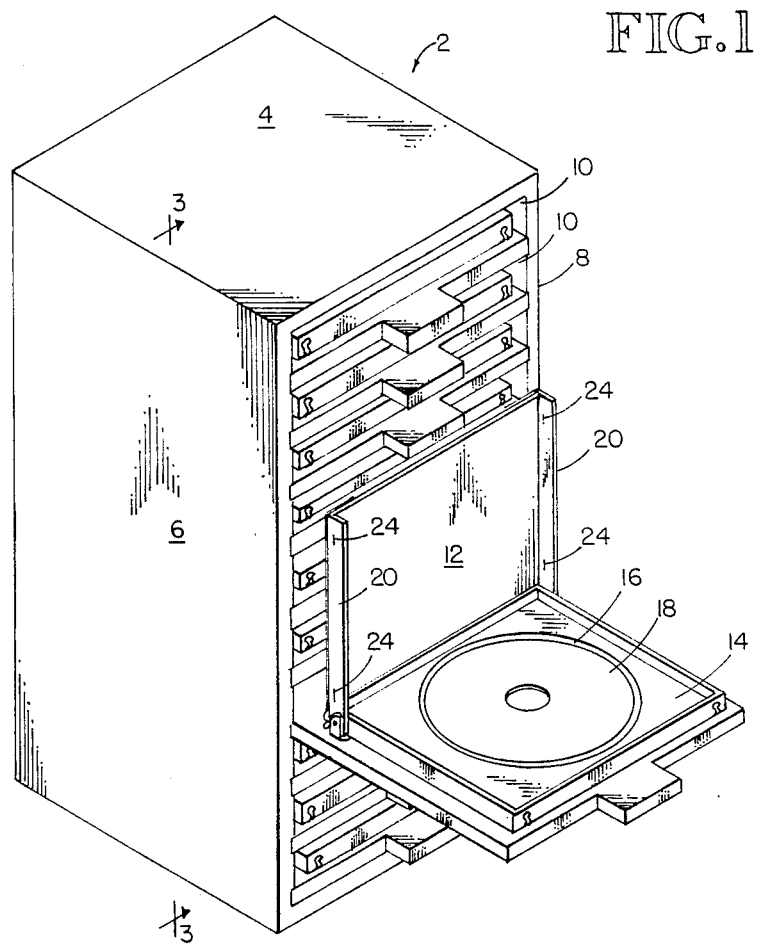
FIG. 1 is a pictorial representation of the multiple disk storage container including the present invention.

As seen in FIG. 1, the preferred embodiment of the present includes an exterior container 2, which in this embodiment, is in the form of a rectangular shell, but it is to be understood that the particular size and shape of the shell will be determined only by the prospective use. The depicted preferred embodiment includes a top 4, a pair of sides 6 and 8 and a plurality of parallel, horizontal divider members 10 such that the storage devices are separated. It is to be understood that the divider members are necessary in terms of one embodiment wherein there is a mechanical means for lifting the cover of the storage container. However, it is certainly within the scope of the present invention that the containers could be separated by other means and, in fact, the shelves, as described hereinafter, with respect to the preferred embodiment could certainly be slideably received in a groove or rabbet.

Figure 2:
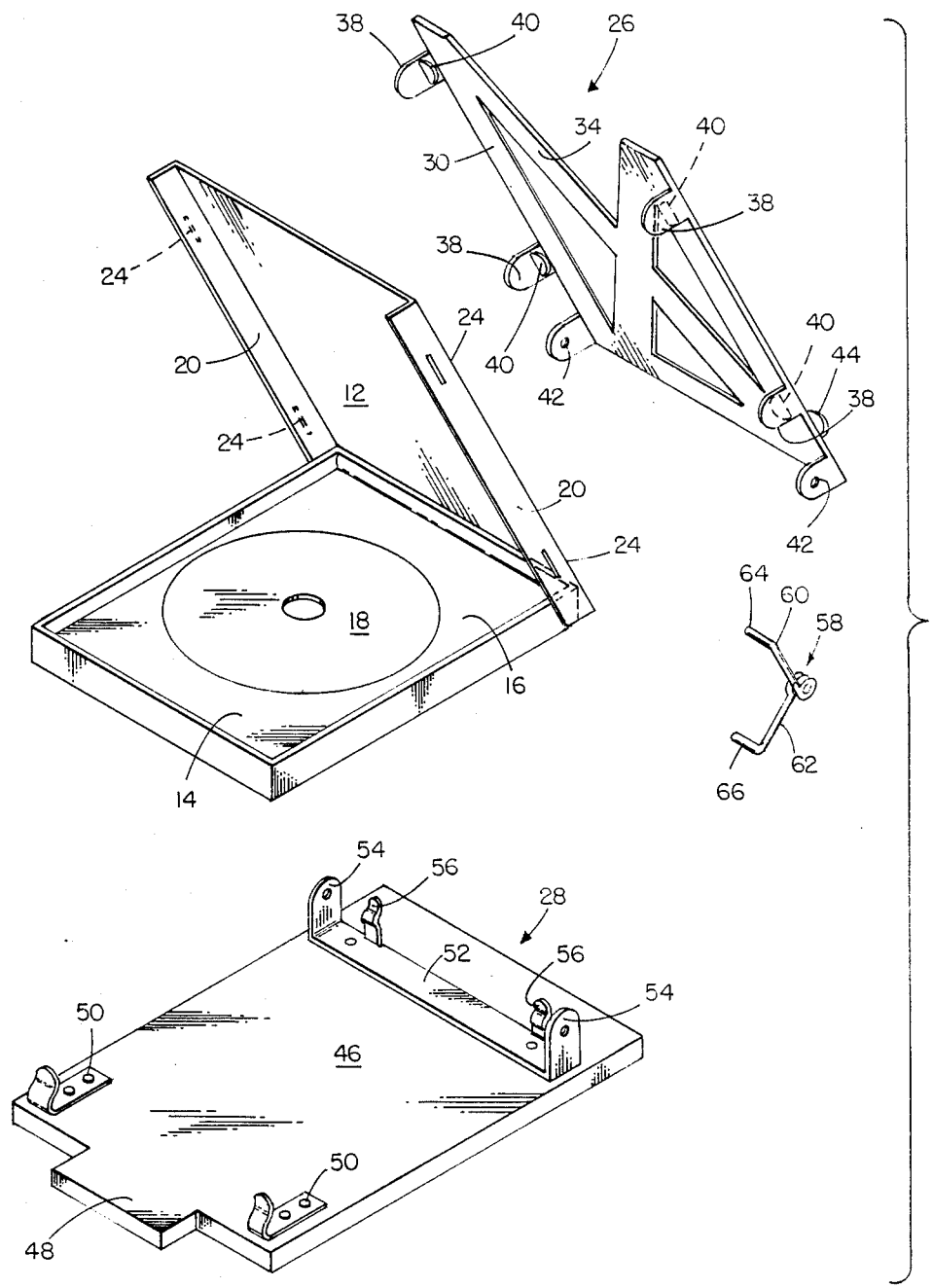
FIG. 2 is an exploded view of the compact disk storage container opening device.

As seen in this view, the compact disk container, which is the container in which the disk is commercially sold, is shown in an open position with the lid 12 raised and spaced from the bottom 14 which includes a recessed portion 16 to receive the disk 18. The cover 12 has sides 20 and a front 22 to overlap the bottom member 14 to assure the disk is kept relatively clean. Also to be seen in this view are a plurality of slots 24 in the sides 20 of the top of the container to be utilized in opening the container, as explained hereinafter. Reference is now had to FIG. 2 wherein the compact disk container may be seen with its top 12, bottom 14, sides 20 including slots 24. Also to be seen in this view is an exploded view of the opener mechanism which includes an upper element generally designated as 26 and lower tray-type element 28.

The upper element, in its preferred embodiment, is generally an X-shaped framework fabricated of sheet material having siderails 30, a back element 32 and a pair of intersecting cross members 34 and 36. Along the outside edges of side members 30 are downwardly projecting tabs 38 having inwardly projecting lateral members 40 which interact with slots 24 locking the top member 26 to the cover member 12 of the storage container for the disk. Likewise extending downwardly from the side rails 30 are additional hinge tabs 42. Along at least one of the side members is an upwardly projecting loop member 44. Hinge member 42 interacts with an identical element on the lower member 28 when the device is assembled, permitting the upper member 26 to pivot upwardly along with the cover 12 of the compact disk storage device. Upwardly extending loop 44 interacts with a spring to automatically open the storage container when the drawer is pulled outwardly, as explained hereinafter.

The bottom member 28 comprises a generally rectangular, flat, rigid shelf member 46 having an outwardly projecting tab member 48 and having, mounted along one surface, a pair of upwardly extending resilient latch members 50 to interact with and resiliently contact the front of the compact disk storage container. Spaced rearwardly from latch members 50, a plate member 52 extends across the upper surface of member 46 and includes a pair of upwardly extending hinge ears 54 for interaction with hinge members 42 and a pair of upwardly extending resilient latch members 56. When the compact disk storage container is in position within the storage device, it is held firmly against member 46 by the interactive cooperation of the latch members 50 and 56.

An axle pin member, not shown, interconnects the hinge tabs or ears 42 and 54 allowing the upper element 26 to pivot about the pin members.

Also seen in this view is a spring member 58 having outwardly extending arms 60, 62 and axially extending leg members 64, 66 to interact respectively with the base member 46 and the ear 44 providing a constant upwardly urging tension, such that when the drawer member 28 is pulled outwardly it carries the compact disk storage container and when it has moved outside of the drawer slots spring member 58 urges top member 26 and attached cover element 12 upwardly exposing the compact disk 18 for easy removal and replacement.

Reference is now had to FIG. 4 wherein the cover member 12 is automatically raised by the interaction of upstanding mechanical pivot member or lever 70 which has a long leg 72 rigidly secured to the top member and a short leg 74 which interacts against a stop member 76 at the front of the cabinet. When the drawer is pulled outwardly 74 contacts stop 76 and as the drawer continues to move outwardly is caused to pivot about the hinge of the storage container cover lifting the cover and exposing the compact disk.

Thus, as can be seen, the present invention discloses a simple and inexpensive means for assuring that compact disks are stored in a clean and safe condition and yet enables the operator to have access to the disk by using only one hand.

I claim:

1. A storage container for recorded media such as compact disks or the like comprising;
    a rigid rectangular hollow shell,
    a plurality of drawers slidingly received in said shell, said drawers each including a rigid base member having secured to one side thereof a pair of spaced upstanding resilient members at the front and back of the base member, said resilient members adapted to frictionally hold a storage container for a compact disk or the like, hinge means securing a top member to the base member, said top member extending substantially over a compact disk storage case and being locked to the cover thereof, and
    means urging the compact disk storage case open when the drawer is pulled to the open position.

2. A storage container as in claim 1 wherein the means urging the case open is a spring element.

3. A storage container as in claim 1 wherein the cover is urged to an open condition by the interaction of an upwardly extending lever which contacts a fixed part of its shell.

4. Means for selectively opening a container such as one for storing a compact disk comprising;
    an upper element adapted to be locked to the cover of the container,
    a lower element including means for securing the bottom of the container,
    hinge means interconnecting the upper and lower elements, and
    means urging the upper element to pivot around the hinge means.

* * * * *